United States Patent
Nishizaki et al.

(10) Patent No.: US 10,245,974 B2
(45) Date of Patent: Apr. 2, 2019

(54) VEHICLE DETECTION SYSTEM

(71) Applicant: Yazaki Corporation, Tokyo (JP)

(72) Inventors: Ryohei Nishizaki, Shizuoka (JP); You Yanagida, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/928,198

(22) Filed: Mar. 22, 2018

(65) Prior Publication Data

US 2018/0304770 A1 Oct. 25, 2018

(30) Foreign Application Priority Data

Apr. 20, 2017 (JP) .................. 2017-083529

(51) Int. Cl.
*B60N 2/00* (2006.01)
*G06K 7/10* (2006.01)
*B60Q 9/00* (2006.01)

(52) U.S. Cl.
CPC ......... *B60N 2/002* (2013.01); *G06K 7/10366* (2013.01); *B60Q 9/00* (2013.01)

(58) Field of Classification Search
CPC ......... B60N 2/02; G06K 7/10366; B60Q 9/00
See application file for complete search history.

(56) References Cited

U.S. PATENT DOCUMENTS

| 2006/0139159 A1* | 6/2006 | Lee .............. B60N 2/002 340/457 |
| 2007/0139185 A1* | 6/2007 | Nathan .............. B60N 2/0244 340/538 |

FOREIGN PATENT DOCUMENTS

JP 2004-189151 A 7/2004

* cited by examiner

*Primary Examiner* — Nabil H Syed
(74) *Attorney, Agent, or Firm* — Sughrue Mion, PLLC

(57) ABSTRACT

A vehicle detection system includes an RFID reader, a detection device, and an ECU. The RFID reader transmits a transmission signal including at least a signal that supplies power. The detection device includes a second antenna unit that mutually transmits and receives a signal to and from the RFID reader, an RFID detection circuit that is activated using the signal that supplies power included in the transmission signal received by the second antenna unit as driving power and that outputs a detection signal to the second antenna unit, and a switch circuit that switches an electrical connection portion between the second antenna unit and the RFID detection circuit to a contact state or to a non-contact state according to a state inside the vehicle. The ECU determines the state inside the vehicle on the basis of the detection signal received by the RFID reader.

5 Claims, 9 Drawing Sheets

VEHICLE DETECTION SYSTEM

CROSS-REFERENCE TO RELATED APPLICATION(S)

The present application claims priority to and incorporates by reference the entire contents of Japanese Patent Application No. 2017-083529 filed in Japan on Apr. 20, 2017.

BACKGROUND OF THE INVENTION

1. Field of the Invention

The present invention relates to a vehicle detection system.

2. Description of the Related Art

Conventionally, a vehicle detection system for detecting a state inside a vehicle that is changed by movement of a passenger in the vehicle may be mounted on the vehicle. For example, the vehicle detection system includes a detection device that detects the presence of a passenger seated on a seat of the vehicle (for example, Japanese Patent Application Laid-open No. 2004-189151).

In a conventional vehicle detection system, a detection device is connected to a battery via wiring, and power is supplied to the detection device from the battery. In this manner, the conventional vehicle detection system requires the battery that supplies power to the detection device and wirings to connect the battery with the detection device, a place to install the detection device is therefore limited. In this respect, there is still room for improvement in the conventional vehicle detection system.

SUMMARY OF THE INVENTION

The present invention has been made in view of the above, and an object of the present invention is to provide a vehicle detection system capable of improving installation property of a detection device.

In order to achieve the above mentioned object, a vehicle detection system according to one aspect of the present invention includes a reading device that is provided in a vehicle, that transmits and receives a signal, and transmits a transmission signal including at least a signal that supplies power, a detection device that is provided in the vehicle and that includes an antenna unit that mutually transmits and receives a signal from and to the reading device, a signal output unit that is activated using the signal that supplies power included in the transmission signal received from the antenna unit as driving power, and that outputs a detection signal to the antenna unit, and a connection switch unit that is provided between the antenna unit and the signal output unit, and that switches an electrical connection portion between the antenna unit and the signal output unit to a contact state or to a non-contact state according to a state inside the vehicle, and a determination unit that is connected to the reading device and is configured to determine the state inside the vehicle based on the detection signal received by the reading device.

According to another aspect of the present invention, in the vehicle detection system, the detection device may be configured to connect the signal output unit and the antenna unit, and transmit the detection signal from the signal output unit via the antenna unit to the reading device, when the connection portion is in the contact state, and disconnect the signal output unit and the antenna unit, and refrain from transmitting the detection signal from the signal output unit via the antenna unit to the reading device, when the contact portion is in the non-contact state, and the determination unit may determine the state inside the vehicle based on the detection signal received by the reading device.

According to still another aspect of the present invention, in the vehicle detection system, a plurality of detection devices may be provided, the detection devices each may include a storage unit that stores therein a different identifier, and may transmit the detection signal including the identifier stored in the storage unit to the reading device, and the determination unit may determine the state inside the vehicle based on the identifier included in the detection signal received by the reading device.

According to still another aspect of the present invention, in the vehicle detection system, the connection switch unit may switch the connection portion to the contact state or to the non-contact state according to movement of a passenger in the vehicle, and the determination unit may determine the movement of the passenger as the state inside the vehicle based on the detection signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention will now be described hereinafter in detail with reference to the accompanying drawings. The present invention is not intended to be limited to what is described in the following embodiments. Moreover, the components described below include components that can be easily assumed by a person skilled in the art, and components that are substantially the same as those components. The components described below can be combined as appropriate. Various omissions, substitutions, or changes may be made without departing from the spirit of the present invention.

First Embodiment

A vehicle detection system 1 according to a first embodiment will be described. The vehicle detection system 1 is mounted on a vehicle 2, and determines a state inside the vehicle 2. For example, the vehicle detection system 1 determines movement of a passenger such as when the passenger is seated. Hereinafter, the vehicle detection system 1 will be described in detail.

Figure 1:
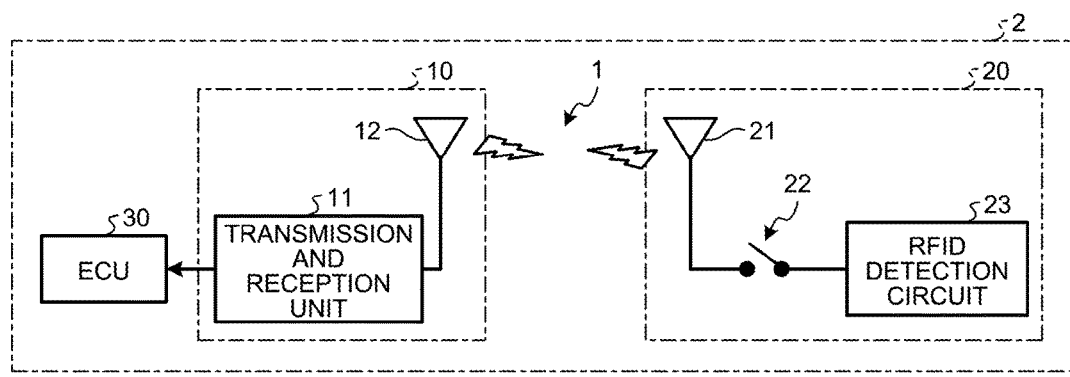
FIG. 1 is a schematic diagram illustrating a configuration example of a vehicle detection system according to a first embodiment.

As illustrated in FIG. 1, the vehicle detection system 1 includes a radio frequency identifier (RFID) reader 10 serving as a reading device, a plurality of detection devices 20, and an electronic control unit (ECU) 30 serving as a determination unit. In this example, the vehicle detection system 1 performs short-range radio communication using communication technology such as the RFID and near field communication (NFC). It is noted that the communication technology used by the vehicle detection system 1 is not limited to RFID and NFC, as long as the communication technology is capable of performing short-range radio communication. For example, in the short-range radio communication, the vehicle detection system 1 performs communication by using a radio wave system that performs modulation and demodulation on the basis of radio waves for communication. For example, the vehicle detection system 1 may also perform communication by using an electromagnetic induction system that performs mutual induction of magnetic field.

Figure 2:
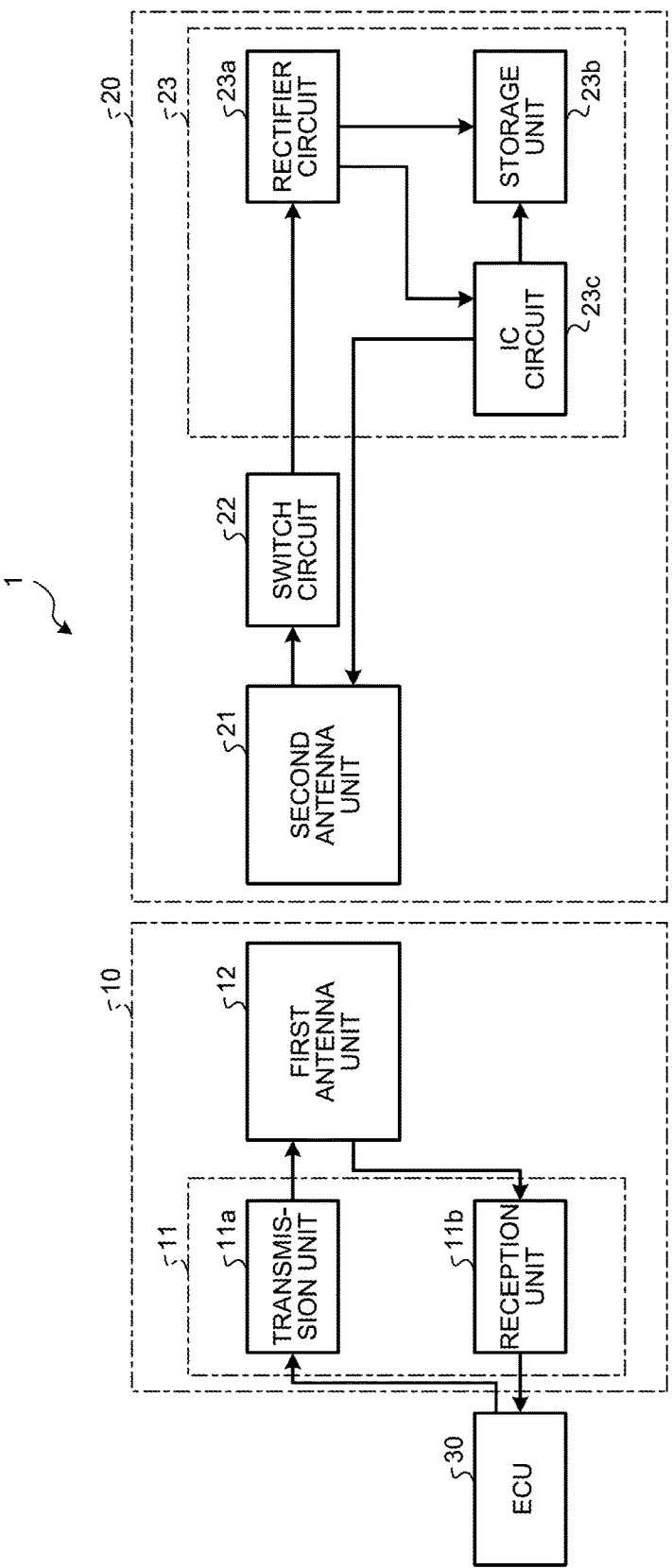
FIG. 2 is a block diagram illustrating a configuration example of the vehicle detection system according to the first embodiment.

The RFID reader 10 is a reading device that transmits and receives a signal. The RFID reader 10 is provided in the vehicle 2, and for example, is provided in an audiovisual (AV) console, meters, a room lamp, a window glass, a sun roof, or the like. For example, the RFID reader 10 transmits a transmission signal including a signal for supplying power and a carrier wave used when each of the detection devices 20 transmits a signal. The RFID reader 10 also receives a detection signal from the detection devices 20. As illustrated in FIG. 2, the RFID reader 10 includes a transmission and reception unit 11 and a first antenna unit 12. The transmission and reception unit 11 includes a transmission unit 11a and a reception unit 11b.

The transmission unit 11a is a circuit that is connected to the first antenna unit 12 and that transmits a signal (radio wave). For example, the transmission unit 11a outputs a transmission signal including a signal that supplies power and a carrier wave used when each of the detection devices 20 transmits a signal, to the first antenna unit 12. The transmission signal may also include an instruction signal serving as an instruction and the like, in addition to the signal that supplies power and the carrier wave.

The reception unit 11b is a circuit that is connected to the first antenna unit 12 and that receives a signal.

The reception unit 11b receives a detection signal transmitted from each of the detection devices 20 via the first antenna unit 12. The reception unit 11b demodulates the received detection signal and outputs the demodulated detection signal to the ECU 30.

The first antenna unit 12 transmits and receives a signal (radio wave). The first antenna unit 12 is connected to the transmission unit 11a, and transmits a transmission signal including a signal that supplies power and a carrier wave that is output from the transmission unit 11a, to the detection devices 20. Moreover, the first antenna unit 12 receives a detection signal from the detection devices 20, and outputs the received detection signal to the reception unit 11b.

Figure 3:
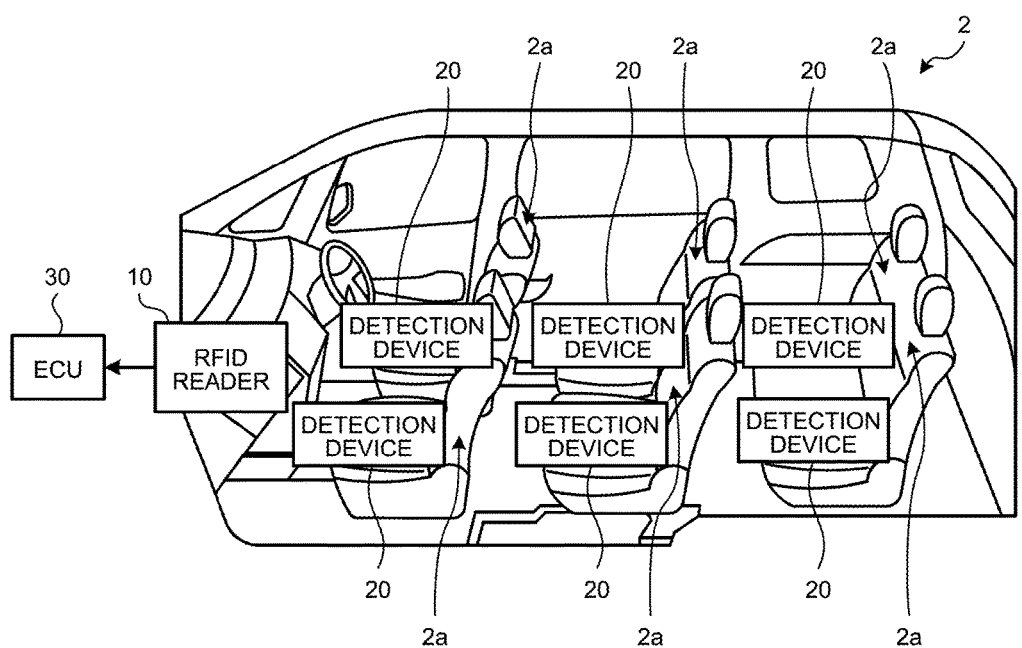
FIG. 3 is a schematic diagram illustrating an installation example of the vehicle detection system according to the first embodiment.
Figure 4:
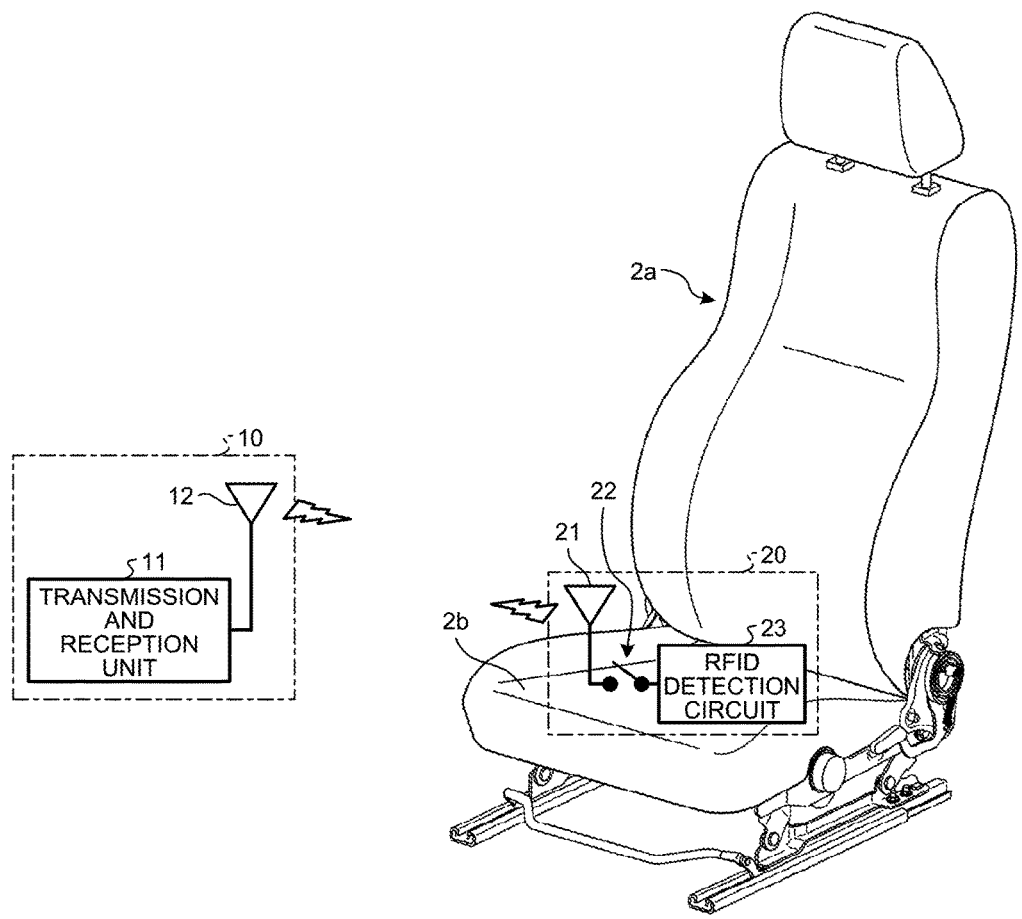
FIG. 4 is a schematic diagram illustrating an installation example of a detection device according to the first embodiment.

Each of the detection devices 20 is a device that is provided in the vehicle 2 and that transmits a detection signal to the RFID reader 10. The detection device 20 is also a device using a passive-type RFID that does not include a battery, and that is activated using a signal that supplies power (may be referred to as electric power) transmitted from the RFID reader 10 as driving power. The detection devices 20 are provided at different locations in the vehicle 2. For example, as illustrated in FIG. 3 and FIG. 4, the detection devices 20 are provided on a plurality of respective seats 2a in the vehicle 2. For example, each of the detection devices 20 is installed in a seat surface unit 2b of the seat 2a.

Each of the detection devices 20 includes a second antenna unit 21 serving as an antenna unit, a switch circuit 22 serving as a connection switch unit, and an RFID detection circuit 23 serving as a signal output unit. The second antenna unit 21 mutually transmits and receives a signal to and from the RFID reader 10. For example, the second antenna unit 21 receives a transmission signal including a signal that supplies power and a carrier wave and transmitted from the RFID reader 10, and outputs the received transmission signal to the RFID detection circuit 23 via the switch circuit 22. The second antenna unit 21 transmits a detection signal output from the RFID detection circuit 23 to the RFID reader 10.

The switch circuit 22 is a circuit that switches electrical connection to ON or OFF. The switch circuit 22 is provided between the second antenna unit 21 and the RFID detection circuit 23, and switches the electrical connection portion between the second antenna unit 21 and the RFID detection circuit 23 to a contact state or to a non-contact state according to the state inside the vehicle 2. For example, the switch circuit 22 includes a first connection point connected to the second antenna unit 21 and a second connection point connected to the RFID detection circuit 23. The switch circuit 22 switches between the contact state in which the first connection point and the second connection point come into contact with each other or the non-contact state in which the first contact point and the second contact point do not come into contact with each other according to the state inside the vehicle 2. For example, in the switch circuit 22, while an external force caused by movement of a passenger is applied, the first contact point and the second contact point are each set to one of ON (contact state) or OFF (non-contact state). While no external force caused by the movement of the passenger is applied, the first contact point and the second contact point are each set to the other of ON or OFF. In the first embodiment, the switch circuit 22 is ON while an external force is applied, and is OFF while an external force is not applied (momentary action). For example, when a passenger is seated on the seat 2a, the switch circuit 22 is switched to ON because the pressure force is applied by the passenger. When no passenger is seated on the seat 2a and no pressure force is applied by the passenger, the switch circuit 22 is switched to become OFF.

The RFID detection circuit 23 is a circuit that outputs a detection signal. In this example, the detection signal is a signal including a different identifier (such as a number and a code) for each of the detection devices 20. The RFID detection circuit 23 is driven using the signal that supplies power transmitted from the RFID reader 10 as driving power, and generates a detection signal. For example, the RFID detection circuit 23 includes a rectifier circuit 23a, a storage unit 23b, and an IC circuit 23c. The rectifier circuit 23a is connected to the second antenna unit 21 via the switch circuit 22, and generates direct current power by rectifying the alternating current power (signal that supplies power) output from the second antenna unit 21. The rectifier circuit 23a is connected to the storage unit 23b and the IC circuit 23c, and supplies the generated direct current power to the storage unit 23b and the IC circuit 23c via a smoothing circuit, which is not illustrated.

The storage unit 23b is a circuit that stores therein a different identifier for each of the detection devices 20. The storage unit 23b is connected to the IC circuit 23c, and the IC circuit 23c refers to the identifiers.

The IC circuit 23c is connected to the storage unit 23b and the second antenna unit 21, acquires an identifier stored in the storage unit 23b, and outputs a detection signal that is obtained by modulating a carrier wave on the basis of the acquired identifier, to the second antenna unit 21.

The ECU 30 is an electronic circuit that controls the entire vehicle 2. The ECU 30 includes an electronic circuit that is mainly composed of a known microcomputer including a central processing unit (CPU), a read-only memory (ROM) and a random-access memory (RAM) forming the storage unit 23b, and an interface. For example, the ECU 30 is connected to the RFID reader 10, and determines the state inside the vehicle 2 on the basis of the detection signal received by the RFID reader 10. The ECU 30 associates the identifier included in the detection signal with the state inside the vehicle 2. For example, the ECU 30 associates different identifiers with the seats 2a in the vehicle 2. Consequently, the ECU 30 can determine the states of the seats 2a on the basis of the identifiers. The ECU 30 controls the transmission unit 11a so as to transmit a transmission signal including a signal that supplies power and a carrier wave to the detection devices 20 at a predetermined interval (such as at a one-second interval).

Figure 5:
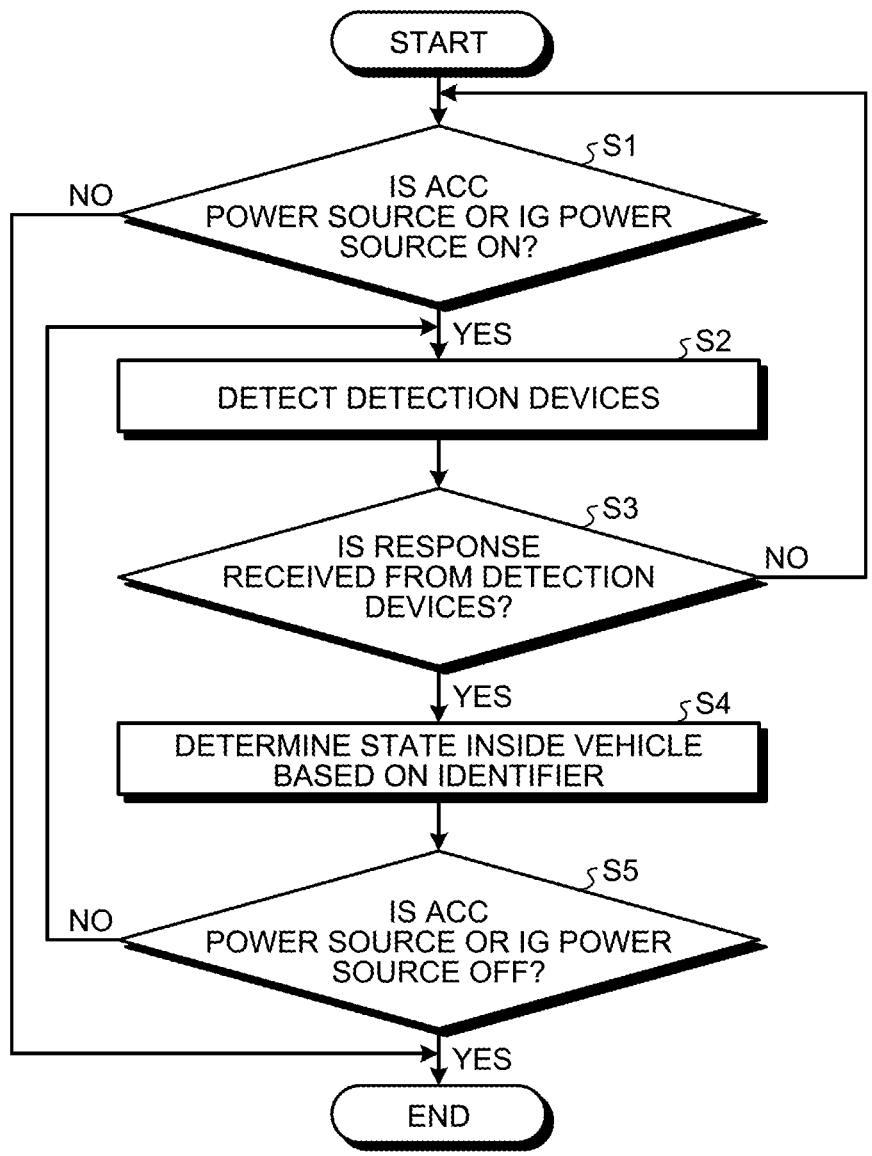
FIG. 5 is a flowchart illustrating an operation example of the vehicle detection system according to the first embodiment.

Next, an operation example of the vehicle detection system 1 will be described with reference to FIG. 5. The ECU 30 of the vehicle detection system 1 determines whether an accessory (ACC) power source or an ignition (IG) power source is ON (step S1). When the ACC power source or the IG power source is ON (Yes in step S1), the ECU 30 detects the detection devices 20 using the RFID reader 10 (step S2). For example, the ECU 30 transmits a transmission signal including a signal that supplies power and a carrier wave to each of the detection devices 20 from the RFID reader 10 at a predetermined interval (such as at a one-second interval). Next, the ECU 30 determines whether a response is received from the detection devices 20 (step S3). When the switch circuit 22 is ON, each of the detection devices 20 connects the RFID detection circuit 23 and the second antenna unit 21, and transmits a detection signal to the RFID reader 10 from the RFID detection circuit 23 via the second antenna unit 21. When the switch circuit 22 is OFF, each of the detection devices 20 disconnects the RFID detection circuit 23 and the second antenna part 21, and does not transmit a detection signal to the RFID reader 10 from the RFID detection circuit 23 via the second antenna unit 21. Upon receiving a detection signal from the detection devices 20, the RFID reader 10 outputs an identifier of the received detection signal to the ECU 30. When the identifier is output from the RFID reader 10, the ECU 30 determines that a response is received from the detection devices 20. When it is determined that a response is received from the detection devices 20 (Yes in step S3), the ECU 30 determines the state inside the vehicle 2 on the basis of the identifier (step S4). For example, the ECU 30 determines that the passenger has been seated on the seat 2a corresponding to the identifier output from the RFID reader 10. Next, the ECU 30 determines whether the ACC power source or the IG power source is OFF (step S5). When the ACC power source or the IG power source is OFF (Yes in step S5), the ECU 30 finishes the process. When the ACC power source or the IG power source is ON (No in step S5), the processing of the ECU 30 returns to step S2 described above, and detects the detection devices 20 using the RFID reader 10.

When the ACC power source or the IG power source is OFF in step S1 described above (No in step S1), the ECU 30 finishes the process. When no response is received from the detection devices 20 in step S3 described above (No in step S3), the ECU 30 detects the detection devices 20 again using the RFID reader 10 (steps S1 and S2).

As described above, the vehicle detection system 1 according to the first embodiment includes the RFID reader 10, the detection device 20, and the ECU 30. The RFID reader 10 transmits a transmission signal at least including a signal for supplying power. The detection device 20 includes the second antenna part 21, the RFID detection circuit 23, and the switch circuit 22. The second antenna unit 21 mutually transmits and receives a signal to and from the RFID reader 10. The RFID detection circuit 23 is activated using a signal for supplying power included in the transmission signal received by the second antenna unit 21 as driving power, and outputs a detection signal to the second antenna unit 21. The switch circuit 22 switches the electrical connection portion between the second antenna unit 21 and the RFID detection circuit 23 to the contact state or to the non-contact state according to the state inside the vehicle 2. The ECU 30 determines the state inside the vehicle 2 on the basis of the detection signal received by the RFID reader 10. In this manner, the detection device 20 transmits a detection signal by switching the electrical connection portion between the second antenna unit 21 and the RFID detection circuit 23 to the contact state. Thus, the ECU 30 can determine the state inside the vehicle 2 on the basis of the detection signal transmitted from the detection device 20. Moreover, the detection device 20 is activated using the signal for supplying power received from the RFID reader 10 as driving power. Thus, the detection device 20 requires no battery or wiring for supplying power. Consequently, the detection device 20 requiring no battery can have a reduced size and weight. Furthermore, it is possible to omit the wiring for supplying power. As a result, the vehicle detection system 1 is capable of improving the installation flexibility of the detection device 20.

In the vehicle detection system 1, when the electrical connection portion between the second antenna unit 21 and the RFID detection circuit 23 is in the contact state, the detection device 20 connects the RFID detection circuit 23 and the second antenna unit 21, and transmits a detection signal from the RFID detection circuit 23 via the second antenna part 21 to the RFID reader 10. When the electrical connection portion between the second antenna unit 21 and the RFID detection circuit 23 is in the non-contact state, the detection device 20 disconnects the RFID detection circuit 23 and the second antenna unit 21, and does not transmit a detection signal from the RFID detection circuit 23 via the second antenna unit 21 to the RFID reader 10. Thus, the ECU 30 determines the state inside the vehicle 2 on the basis of the detection signal received by the RFID reader 10. In this manner, the ECU 30 can determine the state inside the vehicle 2 on the basis of the presence of the detection signal. When a detection signal is transmitted from the detection device 20, the ECU 30 can determine that the state inside the vehicle 2 has changed. For example, the ECU 30 can determine that the passenger has been seated on the seat 2a. Moreover, when a detection signal is no longer transmitted from the state after the detection signal was transmitted from the detection device 20, the ECU 30 can determine that the state inside the vehicle 2 has changed. For example, the ECU 30 can determine that the passenger who was seated on the seat 2a has moved away from the seat 2a.

In the vehicle detection system 1, the detection devices 20 each transmit a detection signal including the identifier stored in the storage unit 23b to the RFID reader 10. The ECU 30 then determines the state inside the vehicle 2 on the basis of the identifier included in the detection signal received by the RFID reader 10. Consequently, the vehicle detection system 1 can determine the state inside the vehicle 2 on the basis of the identifier in the detection signal transmitted from each of the detection devices 20.

In the vehicle detection system 1, the switch circuit 22 switches the electrical connection portion between the second antenna unit 21 and the RFID detection circuit 23 to the contact state or to the non-contact state according to the movement of a passenger in the vehicle 2. The ECU 30 determines the movement of the passenger as the state inside the vehicle 2 on the basis of the detection signal. Consequently, for example, the vehicle detection system 1 can determine that the passenger has been seated on the seat 2a.

Second Embodiment

Next, a vehicle detection system 1A according to a second embodiment will be described. In the second embodiment, the same reference numerals denote the same components as those in the first embodiment, and the detailed description thereof will be omitted. In the vehicle detection system 1A, each of a plurality of detection devices 20A includes a second antenna unit 21A serving as an antenna unit and an RFID detection circuit 23A serving as a signal output unit. The second embodiment is different from the first embodiment in that the second antenna unit 21A and the RFID detection circuit 23A are physically separated from each other in each of the detection devices 20A, and that each of the second antenna unit 21A and the RFID detection circuit 23A is switched to an electrical contact state or to an electrical non-contact state by a contact unit 24, which will be described below.

Figure 6:
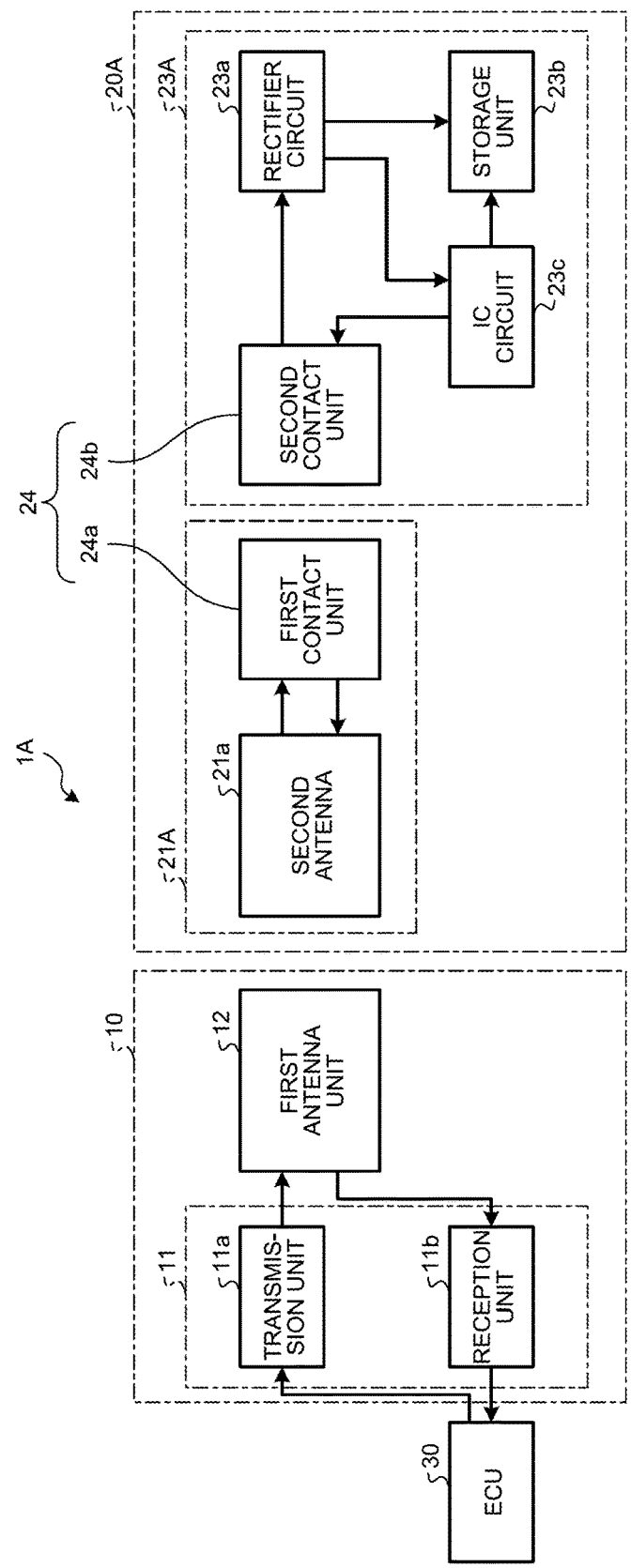
FIG. 6 is a block diagram illustrating a configuration example of a vehicle detection system according to a second embodiment.

As illustrated in FIG. 6, the second antenna unit 21A includes a first contact unit 24a and a second antenna 21a. In the second antenna unit 21A, the first contact unit 24a and the second antenna 21a are connected with each other.

The RFID detection circuit 23A includes a second contact unit 24b, the rectifier circuit 23a, the storage unit 23b, and the IC circuit 23c. In the RFID detection circuit 23A, the second contact unit 24b, the rectifier circuit 23a, and the IC circuit 23c are connected with each other. The first contact unit 24a and the second contact unit 24b form the contact unit (connection switch unit) 24. The contact unit 24 electrically connects the second antenna unit 21A and the RFID detection circuit 23A, when the first contact unit 24a and the second contact unit 24b come into contact with each other according to the state inside the vehicle 2. More specifically, the contact unit 24 electrically connects the second antenna 21a, the rectifier circuit 23a, and the IC circuit 23c. Moreover, the contact unit 24 electrically disconnects the second antenna unit 21A and the RFID detection circuit 23A, when the first contact unit 24a and the second contact unit 24b are brought into the non-contact state according to the state inside the vehicle 2. More specifically, the contact unit 24 electrically disconnects the second antenna 21a, the rectifier circuit 23a, and the IC circuit 23c.

Figure 7:
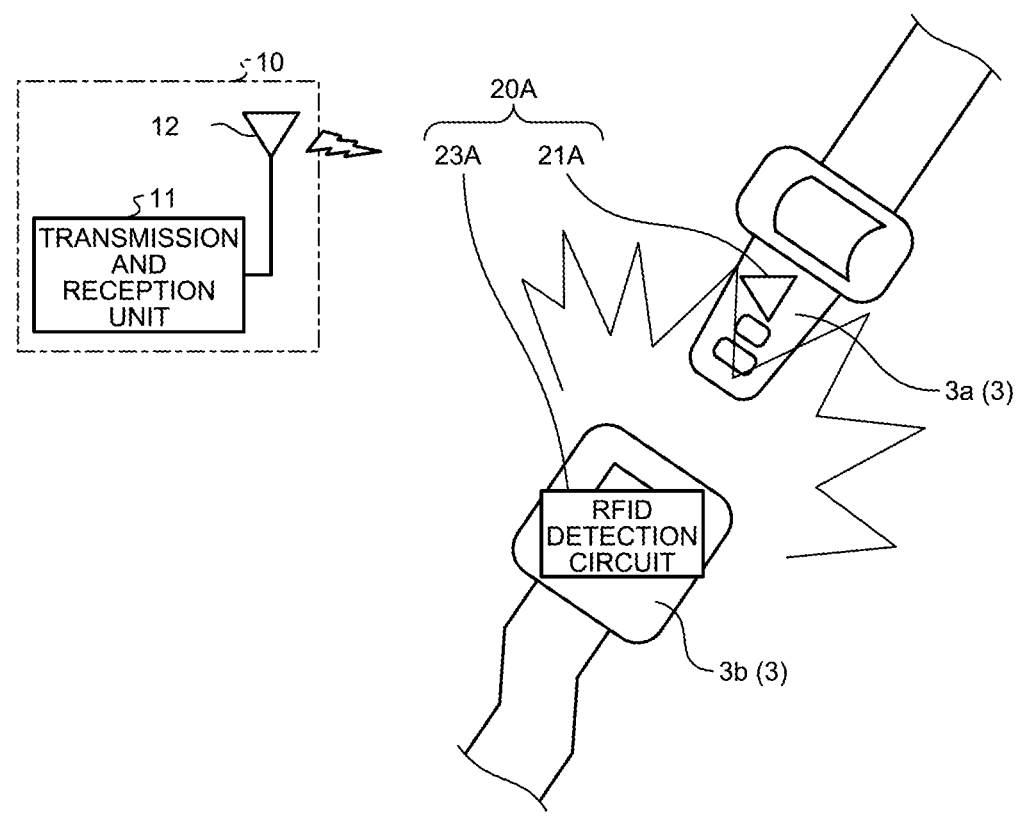
FIG. 7 is a schematic diagram illustrating an installation example of a detection device according to the second embodiment.

For example, as illustrated in FIG. 7, each of the detection devices 20A is provided on a seat belt 3. For example, in each of the detection devices 20A, the second antenna unit 21A is provided on a tongue plate 3a of the seat belt 3, and the RFID detection circuit 23A is provided on a buckle 3b of the seat belt 3. In each of the detection devices 20A, when the tongue plate 3a and the buckle 3b are fastened with each other, the first contact unit 24a of the second antenna unit 21A and the second contact unit 24b of the RFID detection circuit 23A are aligned so as to come into contact with each other. Consequently, when the seat belt 3 is fastened, the contact unit 24 electrically connects the second antenna unit 21A and the RFID detection circuit 23A, and each of the detection devices 20A transmits a detection signal to the RFID reader 10. Moreover, when the seat belt 3 is not fastened, the contact unit 24 does not electrically connect the second antenna unit 21A and the RFID detection circuit 23A, and each of the detection devices 20A does not transmit a detection signal to the RFID reader 10. The ECU 30 determines whether the passenger has fastened the seat belt 3 on the basis of the detection signal received by the RFID reader 10.

As described above, in the vehicle detection system 1A according to the second embodiment, each of the detection devices 20A is provided on each of a plurality of seat belts 3 in the vehicle 2. When the passenger has fastened the seat belts 3, the contact unit 24 electrically connects the second antenna unit 21A and the RFID detection circuit 23A, and a detection signal will be transmitted. When the passenger has not fastened the seat belts 3, the contact unit 24 electrically disconnects the second antenna unit 21A and the RFID detection circuit 23A, and a detection signal will not be transmitted. Consequently, the vehicle detection system 1A can determine whether the passenger has fastened the seat belt 3.

Third Embodiment

Figure 8:
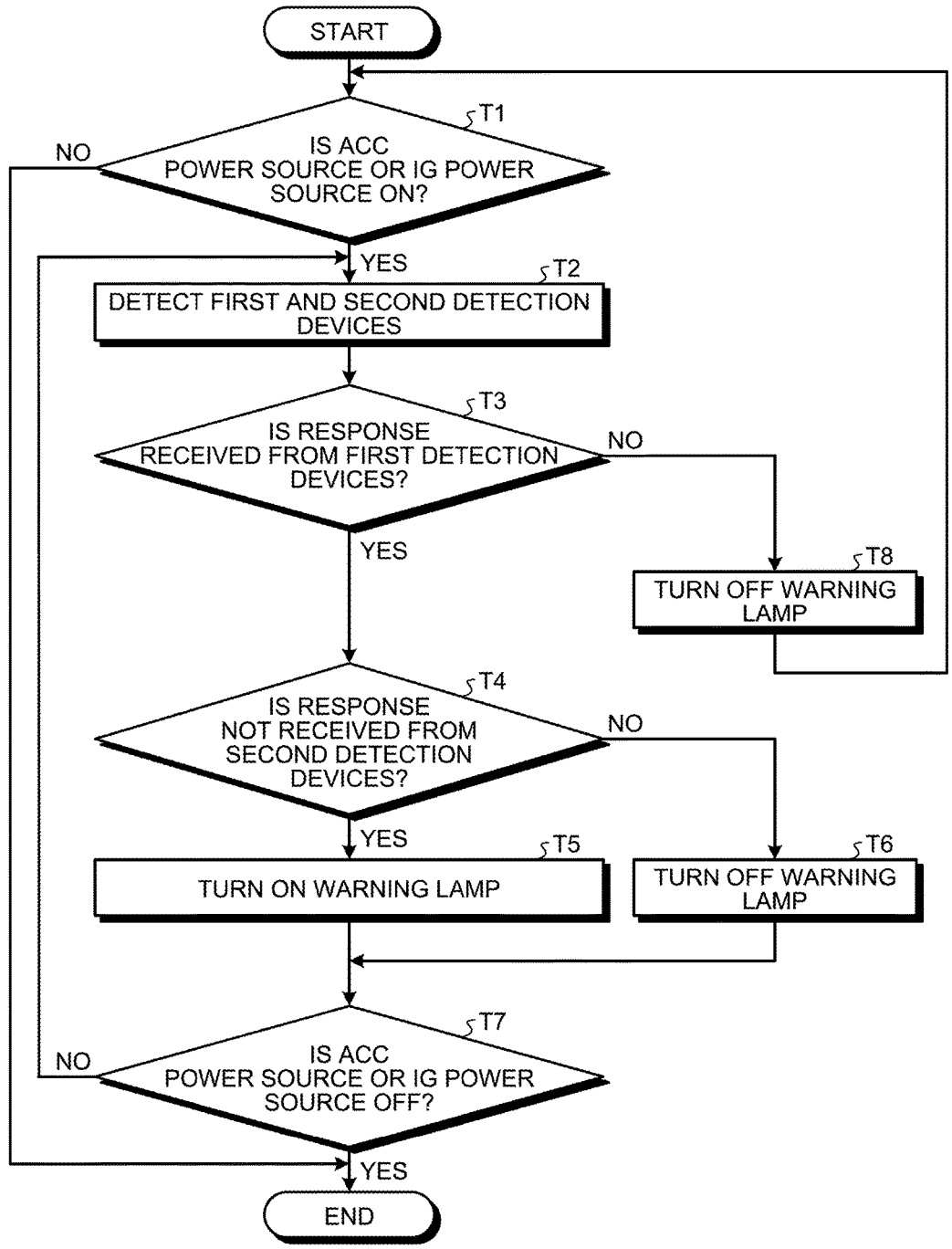
FIG. 8 is a flowchart illustrating an operation example of a vehicle detection system according to a third embodiment.

Next, an operation example of a vehicle detection system (not illustrated) according to a third embodiment will be described with reference to FIG. 8. The third embodiment is different from the first embodiment in determining the state inside the vehicle 2 on the basis of the detection devices 20 provided on the seat 2a and the detection devices 20A provided on the seat belt 3, and in notifying the passenger on the basis of the determined result. In the following explanation, the detection device 20 provided on the seat 2a may also be referred to as a "first detection device 20", and the detection device 20A provided on the seat belt 3 may also be referred to as a "second detection device 20A". The ECU 30 determines whether the ACC power source or the IG power source is ON (step T1). When the ACC power source or the IG power source is ON (Yes in step T1), the ECU 30 detects the first and the second detection devices 20 and 20A using the RFID reader 10 (step T2). For example, the ECU 30 transmits a transmission signal including a signal for supplying power and a carrier wave to the first and the second detection devices 20 and 20A from the RFID reader 10 at a predetermined interval (such as at a one-second interval). Next, the ECU 30 determines whether a response is received from the first detection devices 20 (step T3). In other words, the ECU 30 determines whether the passenger has been seated on each of the seats 2a. In this process, when the switch circuit 22 is ON, the first detection devices 20 provided on the seats 2a each transmit a detection signal to the RFID reader 10, and when the switch circuit 22 is OFF, each of the first detection devices 20 does not transmit a detection signal to the RFID reader 10. Upon receiving the detection signal from the first detection devices 20, the RFID reader 10 outputs an identifier of the received detection signal to the ECU 30. When the identifier is output from the RFID reader 10, the ECU 30 determines that a response is received from the first detection device 20, and when the identifier is not output from the RFID reader 10, the ECU 30 determines that no response is received from the first detection device 20. When a response is received from the first detection device 20 (Yes in step T3), the ECU 30 determines that the passenger has been seated on the seat 2a and the processing proceeds to step T4.

The ECU 30 determines whether a response is received from each of the second detection devices 20A (step T4). In other words, the ECU 30 determines whether the passenger has fastened the seat belt 3 in the seat 2a on which the passenger is seated. In this process, when the contact unit 24 is in the contact state, the second detection device 20A provided on each of the seat belts 3 transmits a detection signal to the RFID reader 10. When the contact unit 24 is not in the contact state, the second detection device 20A provided on each of the seat belts 3 does not transmit a detection signal to the RFID reader 10. Upon receiving the detection signal from the second detection device 20A, the RFID reader 10 outputs an identifier of the received detection signal to the ECU 30. The ECU 30 determines that a response is received from the second detection device 20A when the identifier is output from the RFID reader 10, and determines that no response is received from the second detection device 20A when the identifier is not output from the RFID reader 10. When no response is received from the second detection device 20A for the seat 2a on which the passenger is seated (Yes in step T4), the ECU 30 determines that the seat belt 3 is not fastened, and turns on a warning lamp (step T5). The warning lamp is an indication lamp that is installed on an instrument panel of the vehicle 2 and that indicates whether the seat belt 3 is fastened. The warning lamp may be a single warning lamp representing all the seats 2a, or a plurality of warning lamps provided for each of the seats 2a. Moreover, a warning buzzer and the like may also be used to notify the passenger in addition to the warning lamp. When a response is received from the second detection device 20A in step T4 described above (No in step T4), the ECU 30 determines that the seat belt 3 is fastened, and turns off the warning lamp (step T6). Next, the ECU 30 determines whether the ACC power source or the IG power source is OFF (step T7). When the ACC power source or the IG power source is OFF (Yes in step T7), the ECU 30 finishes the process. When the ACC power source or the IG power source is ON (No in step T7), the processing of the ECU 30 returns to step T2 described above, and detects the first and the second detection devices 20 and 20A using the RFID reader 10. When the ACC power source or the IG power source is OFF in step T1 described above (No in step T1), the ECU 30 finishes the process. When no response is received from the first detection devices 20 in step T3 described above (No in step T3), the ECU 30 determines that the passenger is not seated on the seat 2a, and turns off the warning lamp (step T8).

As described above, the vehicle detection system according to the third embodiment determines the state inside the vehicle 2 on the basis of the detection signal transmitted from the first detection devices 20 provided on the seat 2a and the second detection devices 20A provided on the seat belt 3, and notifies the passenger on the basis of the determined result. Consequently, the vehicle detection system can notify the passenger when the passenger is not fastening the seat belt 3.

Modification

Figure 9:
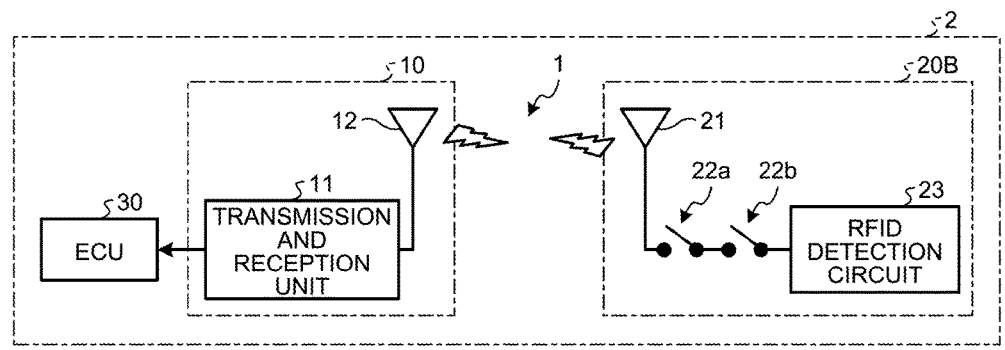
FIG. 9 is a schematic diagram illustrating a configuration example of a vehicle detection system according to a modification.

Next, a modification will be described. The detection device 20 may include a plurality of switch circuits. For example, as illustrated in FIG. 9, a detection device 20B includes a first switch circuit 22a and a second switch circuit 22b. The first and the second switch circuits 22a and 22b are provided at different locations in the vehicle 2. The first and the second switch circuits 22a and 22b are connected in series between the second antenna part 21 and the RFID detection circuit 23. The first and the second switch circuits 22a and 22b are OFF while no external force is applied, and are ON while an external force is applied. The detection device 20B transmits a detection signal to the RFID reader 10 when the first switch circuit 22a and the second switch circuit 22b are ON, and does not transmit a detection signal to the RFID reader 10 when one of the first switch circuit 22a and the second switch circuit 22b is OFF. Upon receiving the detection signal via the RFID reader 10, the ECU 30 determines that the passenger has executed two movements.

Figure 10:
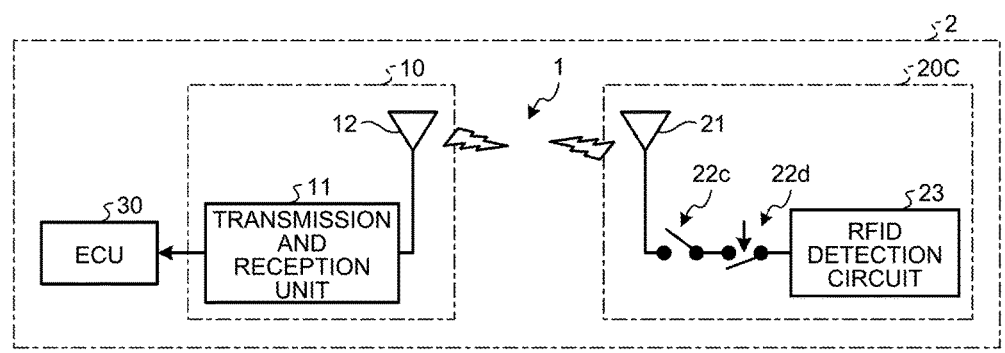
FIG. 10 is a schematic diagram illustrating a configuration example of the vehicle detection system according to the modification.

For example, as illustrated in FIG. 10, a detection device 20C may include a first switch circuit 22c and a second switch circuit 22d. The first and the second switch circuits 22c and 22d are provided at different locations in the vehicle 2. The first and the second switch circuits 22c and 22d are connected in series between the second antenna unit 21 and the RFID detection circuit 23. The first switch circuit 22c is OFF while no external force is applied, and is ON while an external force is applied. Unlike the first switch circuit 22c, the second circuit 22d is ON while no external force is applied, and is OFF while an external force is applied. The detection device 20C transmits a detection signal to the RFID reader 10 when the first switch circuit 22c is ON, and does not transmit a detection signal to the RFID reader 10 when the first switch circuit 22c or the second switch circuit 22d is OFF. For example, the first switch circuit 22c is provided on the seat 2a, and the second switch circuit 22d is provided on the seat belt 3. When a passenger is seated on the seat 2a, the first switch circuit 22c is switched from OFF to ON. When the seat belt 3 is fastened, the second switch circuit 22d is switched from ON to OFF. Consequently, when the first switch circuit 22c and the second switch circuit 22d are ON, the detection device 20C detects that the passenger has been seated on the seat 2a and the seat belt 3 has not been fastened. The ECU 30 then notifies the passenger by a warning lamp and the like on the basis of the detected result of the detection device 20C. Moreover, when the first switch circuit 22c or the second switch circuit 22d is OFF, the detection device 20C detects that no passenger is seated on the seat 2a, or a passenger has fastened the seat belt 3. Thus, the ECU 30 does not notify the passenger by a warning lamp or the like on the basis of the detected result of the detection device 20C.

The detection devices 20 may also be used as a remote controller, a touch panel, and a bus stop button. For example, when the detection devices 20 are provided on locations where a passenger can operate, and when the passenger has turned ON the switch circuit 22, each of the detection devices 20 makes the electrical connection portion between the second antenna unit 21 and the RFID detection circuit 23 in the contact state, and transmits a detection signal. When the passenger has turned OFF the switch circuit 22, each of the detection devices 20 makes the second antenna part 21 and the RFID detection circuit 23 in an electrical non-contact state, and does not transmit a detection signal. The ECU 30 determines the operation performed by the passenger on the basis of the detection signal.

Moreover, the detection device 20A may detect the position of a movable seat (such as a long sliding seat and a folding seat) in the vehicle 2. In this case, the detection device 20 can omit the wiring for supplying power. Thus, unlike the conventional example, even if the moving range of the seat becomes wide, the wiring that supplies power is prevented from becoming complicated and there is no need to provide a mechanism that absorbs an extra length of the wiring.

Moreover, the detection device 20A may be provided on the door of the vehicle 2. Furthermore, the detection device 20 may be provided on a child car seat. Still furthermore, the detection device 20 may be provided on a seat belt of the child car seat.

The ECU 30 is used as the determination unit, but it is not limited thereto. For example, an arithmetic part different from the ECU 30 may be used as the determination unit. In this case, the arithmetic part determines the state inside the vehicle 2 on the basis of the identifier output from the RFID reader 10, and outputs the determined result to the ECU 30. The ECU 30 as the determination unit may also include the transmission and reception unit 11 of the RFID reader 10.

With the vehicle detection system according to each of the present embodiments, the detection device transmits a detection signal by switching the electrical connection portion between the antenna unit and the signal output unit to the contact state. Thus, the determination unit can determine the state inside the vehicle on the basis of the detection signal transmitted from the detection device. Moreover, because the detection device is activated using the signal that supplies power received from the reading device as driving power, the battery and the wiring that supplies power are not required. Thus, the detection device requiring no battery can have a reduced size and weight. Furthermore, it is possible to omit the wiring for supplying power. As a result, the vehicle detection system is capable of improving the installation property of the detection device.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle detection system, comprising:
    a reading device that is provided in a vehicle, transmits and receives a signal, and transmits a transmission signal including at least a signal that supplies power;
    a detection device that is provided in the vehicle and that includes
        an antenna that mutually transmits and receives a signal from and to the reading device,
        a signal output circuit that is activated using the signal that supplies power included in the transmission signal received by the antenna as driving power, and outputs a detection signal to the antenna, and
        a first connection switch provided between the antenna and the signal output circuit, and that switches a first electrical connection portion between the antenna and the signal output circuit to a contact state or to a non-contact state according to a first characteristic of a state inside the vehicle;
        a second connection switch provided between the antenna and the signal output circuit, and that switches a second electrical connection portion between the antenna and the signal output circuit to a contact state or to a non-contact state according to a second characteristic of the state inside the vehicle; and
    at least one processor that is connected to the reading device and is configured to determine the state inside the vehicle based on the detection signal received by the reading device, wherein
    the detection device is configured to
        connect the signal output circuit and the antenna, and transmit the detection signal from the signal output circuit via the antenna to the reading device, when the first electrical connection portion and the second electrical connection portion are simultaneously in the contact state, and
        disconnect the signal output circuit and the antenna, and refrain from transmitting the detection signal from the signal output circuit via the antenna to the reading device, when either the first electrical connection portion or the second electrical connection portion is in the non-contact state, and
    the at least one processor determines the state inside the vehicle based on the detection signal received by the reading device.

2. The vehicle detection system according to claim 1, wherein
    a plurality of detection devices are provided,
    the detection devices each includes an electronic storage unit that stores therein a different identifier, and transmits the detection signal including the identifier stored in the electronic storage unit to the reading device, and
    the at least one processor determines the state inside the vehicle based on the identifier included in the detection signal received by the reading device.

3. The vehicle detection system according to claim 1, wherein
    the first connection switch switches the first electrical connection portion to the contact state or to the non-contact state according to a first movement of a passenger in the vehicle,
    the second connection switch switches the second electrical connection portion to the contact state or to the non-contact state according to a second movement of the passenger in the vehicle, and
    the at least one processor determines the first movement and the second movement of the passenger as the state inside the vehicle based on the detection signal.

4. The vehicle detection system according to claim 2, wherein
    the first connection switch switches the first electrical connection portion to the contact state or to the non-contact state according to a first movement of a passenger in the vehicle,
    the second connection switch switches the second electrical connection portion to the contact state or to the non-contact state according to a second movement of the passenger in the vehicle, and
    the at least one processor determines the first movement and the second movement of the passenger as the state inside the vehicle based on the detection signal.

5. The vehicle detection system according to claim 1, wherein
    the first connection switch switches the first electrical connection portion to the contact state when a passenger is seated on a seat of the vehicle, and
    the second connection switch switches the second electrical connection portion to the non-contact state when a seatbelt of the seat is fastened, and the at least one processor is configured to determine that the passenger is seated on the seat with the seatbelt unfastened based on the detection signal being received by the reading device.

\* \* \* \* \*